July 14, 1936.  R. HAFNER  2,047,776
HELICOPTER AND ROTATING WING AIRCRAFT
Filed March 29, 1935
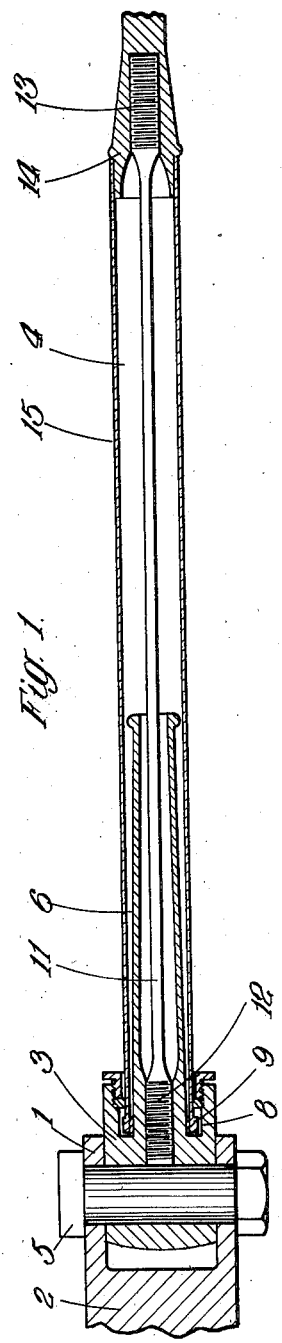
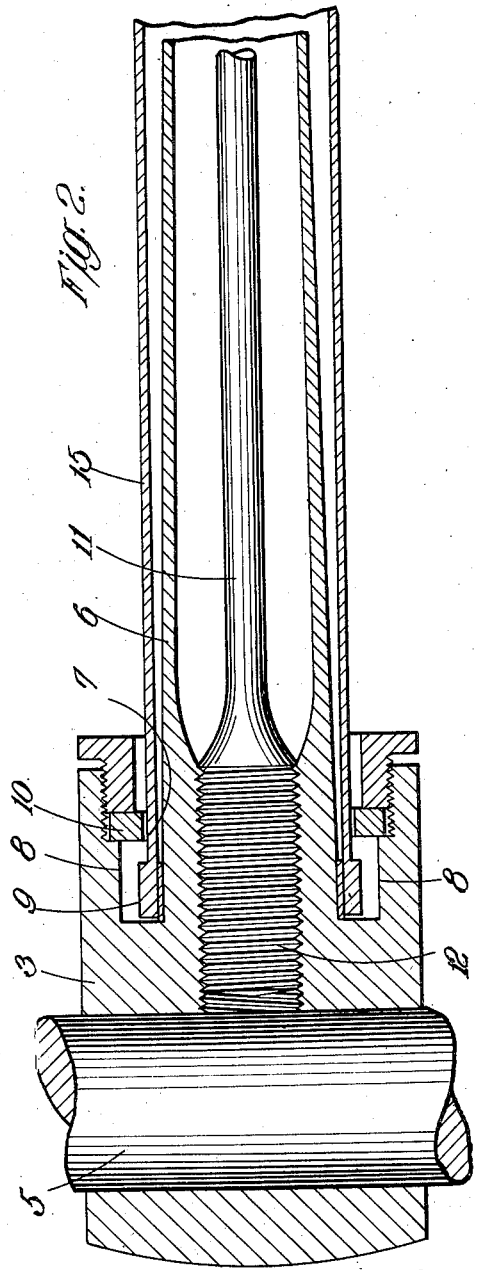
Raoul Hafner
INVENTOR Patented July 14, 1936

2,047,776

UNITED STATES PATENT OFFICE 2,047,776

HELICOPTER AND ROTATING WING AIRCRAFT

Raoul Hafner, Vienna, Austria

Application March 29, 1935, Serial No. 13,633
In Great Britain April 23, 1934

2 Claims. (Cl. 170—173)

This invention relates to helicopter and rotating wing aircraft particularly of the kind having flapping blades controlled by varying the inclination of the blades either differentially or as a whole. According to my prior patent application No. 23,645 of 1933, the blades are connected to the central hub by means of torsionally flexible radial members which take the centrifugal forces set up by the blades and enable the inclination to be varied without friction.

If, however, these tension members break, there is nothing to prevent the blades from flying off and moreover, there is nothing to prevent the said tension members from being overstrained.

The primary object of this invention is to prevent the said blades from flying off in the event of failure of the said tension members and also to prevent the tension members being overstrained.

According to this invention helicopter and rotating wing aircraft, having blades connected to the central hub by torsionally flexible tension members to facilitate control of their inclination, are provided with annular stops on the roots of the blades adapted to be engaged by corresponding rings carried by the hub unit in the event of failure or overstrain of the said torsionally flexible tension members. The torsionally flexible tension members, preferably consist of swaged tie rods, having enlarged ends the inner of which are screwed into the hub unit and the outer to the blade.

The invention is described with reference to the accompanying drawing, wherein,

Figure 1 shows a cross section along the longitudinal axis of the inner portion of a blade.

Figure 2 shows an enlarged detail of a part of Figure 1.

Forked shank portions 1 of a flapping hub member 2 are connected to a rocking member 3 carrying the blade 4 by means of a rocking bolt 5 provided with any suitable means for damping down oscillations. The rocking member 5 is provided with an inner tubular extension 6 upon which the inner end 7 of the blade 4 is adapted to swivel and an outer tubular extension 8. The extreme inner end of the blade is provided with an externally projecting annular ring 9, and the outer end of the outer tubular extension 8 is provided with a detachable inwardly projecting ring 10 adapted to engage with the ring 9. The ring 10 is clamped within the extension 8 by means of an annular screw formed with a nut head.

A torsionally flexible tension member 11 consists of a swaged steel tie rod having enlarged screwed ends 12, 13 which are respectively screwed into the rocking member 3 and into a member 14 which connects together the inner portion 7 and outer portion 15 of the blade 4.

In the event of the tie rod failing, or becoming overstrained, the stop ring 9 comes into engagement with the ring 10. Normally there is an allowed clearance between these two rings so that they do not contact under normal centrifugal loads, but only under definite overloading. Unevenness in pressure on the control stick would draw attention to such an occurrence.

The inner surface of the safety ring 10 may be acid etched, painted, or otherwise treated so that any friction indications appearing on this surface may be at once detected during overhaul.

The rigidity of the tie rod 11 is preferably made of such an amount as to restore its blade to its normal inclination when the control force is removed. The blade is also so shaped that the aerodynamic forces acting upon it tend to restore it to its normal working inclination.

By this means a stable easily controlled machine is obtained.

What I claim and desire to secure by Letters Patent of the United States is:—

1. In helicopter and rotating wing aircraft the combination, with a central rotary hub unit, of supporting blades radiating therefrom, torsionally flexing tension members constituting the anchorages of said blades to said hub unit, and spaced safety stop members carried by said hub unit and said blades respectively for interengagement in the event of overstrain or failure of any of said tension members.

2. In helicopter and rotating wing aircraft the combination, with a central rotary hub unit, of supporting blades radiating therefrom, torsionally flexing steel swaged tie rods constituting the anchorages of said blades to said hub unit, and spaced safety stop members carried by said hub unit and said blades respectively for interengagement in the event of overstrain or failure of any of said tie rods.

RAOUL HAFNER.